US008918791B1

(12) United States Patent
Chudgar et al.

(10) Patent No.: US 8,918,791 B1
(45) Date of Patent: Dec. 23, 2014

(54) METHOD AND SYSTEM FOR QUEUING A REQUEST BY A PROCESSOR TO ACCESS A SHARED RESOURCE AND GRANTING ACCESS IN ACCORDANCE WITH AN EMBEDDED LOCK ID

(75) Inventors: Keyur Chudgar, San Jose, CA (US); Vinay Ravuri, Cupertino, CA (US); Kumar Sankaran, San Jose, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 289 days.

(21) Appl. No.: 13/045,453

(22) Filed: Mar. 10, 2011

(51) Int. Cl.
*G06F 9/455* (2006.01)
*G06F 9/46* (2006.01)

(52) U.S. Cl.
USPC .......................................... 718/104; 718/102

(58) Field of Classification Search
None
See application file for complete search history.

(56) References Cited

U.S. PATENT DOCUMENTS

| 7,634,776 | B2 | 12/2009 | Parameswaran et al. | |
|---|---|---|---|---|
| 7,743,191 | B1 | 6/2010 | Liao | |
| 7,779,412 | B2 | 8/2010 | Lin et al. | |
| 8,155,134 | B2 * | 4/2012 | Fairhurst et al. | 370/413 |
| 8,321,869 | B1 * | 11/2012 | Lan et al. | 718/102 |
| 2003/0212830 | A1 * | 11/2003 | Greenblat et al. | 709/251 |
| 2007/0220517 | A1 * | 9/2007 | Lippett | 718/102 |
| 2008/0189522 | A1 | 8/2008 | Meil et al. | |
| 2008/0263555 | A1 | 10/2008 | Ventroux et al. | |
| 2009/0086737 | A1 * | 4/2009 | Fairhurst et al. | 370/394 |
| 2009/0133021 | A1 | 5/2009 | Coulter | |
| 2009/0172212 | A1 | 7/2009 | Stanton | |
| 2009/0271624 | A1 * | 10/2009 | Cao et al. | 713/169 |
| 2009/0282408 | A1 | 11/2009 | Joffe | |
| 2010/0115168 | A1 * | 5/2010 | Bekooij | 710/244 |
| 2010/0191911 | A1 | 7/2010 | Heddes et al. | |
| 2010/0262973 | A1 | 10/2010 | Ernst | |
| 2010/0274412 | A1 | 10/2010 | Saito et al. | |
| 2010/0299499 | A1 | 11/2010 | Golla | |
| 2012/0131309 | A1 * | 5/2012 | Johnson et al. | 712/41 |

* cited by examiner

*Primary Examiner* — Meng An
*Assistant Examiner* — Bradley Teets
(74) *Attorney, Agent, or Firm* — Amin, Turocy & Watson, LLP

(57) ABSTRACT

A hardware-based method is provided for allocating shared resources in a system-on-chip (SoC). The SoC includes a plurality of processors and at least one shared resource, such as an input/output (IO) port or a memory. A queue manager (QM) includes a plurality of input first-in first-out memories (FIFOs) and a plurality of output FIFOs. A first application writes a first request to access the shared resource. A first application programming interface (API) loads the first request at a write pointer of a first input FIFO associated with the first processor. A resource allocator reads the first request from a read pointer of the first input FIFO, generates a first reply, and loads the first reply at a write pointer of a first output FIFO associated with the first processor. The first API supplies the first reply, from a read pointer of the first output FIFO, to the first application.

20 Claims, 4 Drawing Sheets

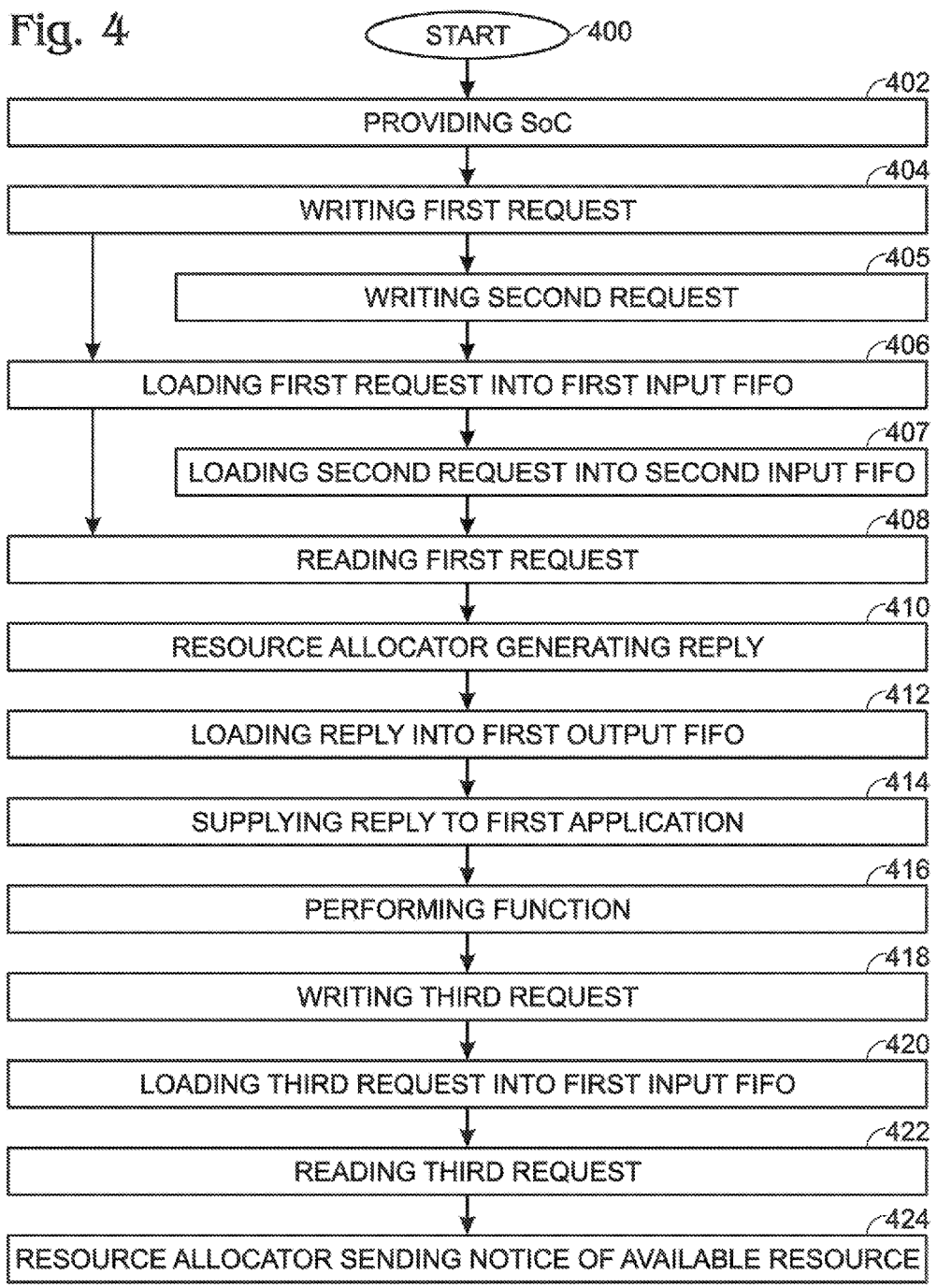

METHOD AND SYSTEM FOR QUEUING A REQUEST BY A PROCESSOR TO ACCESS A SHARED RESOURCE AND GRANTING ACCESS IN ACCORDANCE WITH AN EMBEDDED LOCK ID

BACKGROUND OF THE INVENTION

1. Field of the Invention

This invention generally relates to an integrated circuit (IC) system-on-chip (SoC) and, more particularly, to a system and method for allocating SoC shared resources between processors using a hardware queue manager and resource allocator.

2. Description of the Related Art

A system may include multiple central processing units (CPUs), also referred to as processors, cores, or microprocessors, running in the same system. A single SoC may have multiple systems or a system may include multiple SoCs, with multiple CPUs on each SoC. Due to contention between CPUs, it is difficult to share the same resource (e.g., a memory or input/output (IO) port). Because of this issue, a conventional system is setup to have IO resource dedicated to each CPU. For example, if the SoC has two cores and two peripheral component interconnect (PCI) ports, each PCI port is dedicated to a corresponding CPU. Thus, even though there are two physical PCI ports available in the system, effectively only one is available for a given CPU. As another example, an SoC can have four CPU cores, 4 PCIe (PCI express) interfaces, 3 universal serial bus (USB) interfaces, and 4 Ethernet interfaces, where each interface is dedicated to a different CPU.

As today's applications require more computing power and IO data centric processing, there is commercial pressure to reduce the die size of the semiconductor device, increase performance, reduce cost, reduce power, and increase throughput. It would be advantageous if the number of CPU dedicated resources could be reduced by having the CPUs share. However, because CPUs run different applications, which are generally not aware of the usage of other CPU's applications, it is difficult to share resources. Further, even though there are multiple IOs in the system, the dedication of resources to specific CPUs introduces an overall restriction in system usage if each application cannot efficiently perform using only one dedicated IO resource.

It would be advantageous if a simple hardware mechanism could be used to establish resource access priority, with software-based locking to support resource grants and tracked resource usage.

SUMMARY OF THE INVENTION

The system and method described herein permit resources to be efficiently shared and accessed by all the central processing units (CPUs) of a system-on-chip (SoC). As a result, each CPU has system wide access, able to use any shared resource, as long as it follows certain rules to protect the resource. For example, if there is only one serial advanced technology attachment (SATA) port in the system, and a SATA disk (memory) is attached to a system of multiple processor cores, it becomes possible to have each core boot from a different operating system (OS) in a different partition of the same SATA disk. As another example, if there are two Ethernet ports available in a system with two CPUs, both ports can be used by both CPUs. One CPU can process a certain kind of network traffic (i.e. control traffic) received via both ports, and the other core can process a different kind of network traffic (i.e. data traffic) received via both ports. Such an arrangement improves system load balancing.

Accordingly, a hardware-based method is provided for allocating shared resources in a SoC. The method begins with an SoC having a first plurality of processors and at least one shared resource, such as an input/output (IO) port or a memory. A queue manager (QM) is provided with a first plurality of input first-in first-out memories (FIFOs) and a first plurality of output FIFOs. A resource allocator is enabled as a sequence of software instructions executed by an allocation processor. A first application, enabled as a sequence of software instructions stored in memory and executed by a first processor, writes a first request to access the shared resource. A first application programming interface (API), enabled as a sequence of software instructions stored in memory and executed by a first processor, loads the first request at a write pointer of a first input FIFO associated with the first processor. The resource allocator reads the first request from a read pointer of the first input FIFO, generates a first reply responsive to the first request, and loads the first reply at a write pointer of a first output FIFO associated with the first processor. The first API supplies the first reply, from a read pointer of the first output FIFO, to the first application, and the first application performs a function in response to the first reply. If the first reply is a resource grant, the first application would access the shared resource as instructed in the reply. The QM enqueues the output FIFOs and dequeues the input FIFOs using a simple hardware-based algorithm.

Additional details of the above-described method and an SoC with a hardware-based system for allocating shared resources are provided below.

BRIEF DESCRIPTION OF THE DRAWINGS

FIG. 4 is a flowchart illustrating a hardware-based method for allocating shared resources in an SoC.

DETAILED DESCRIPTION

Figure 1:
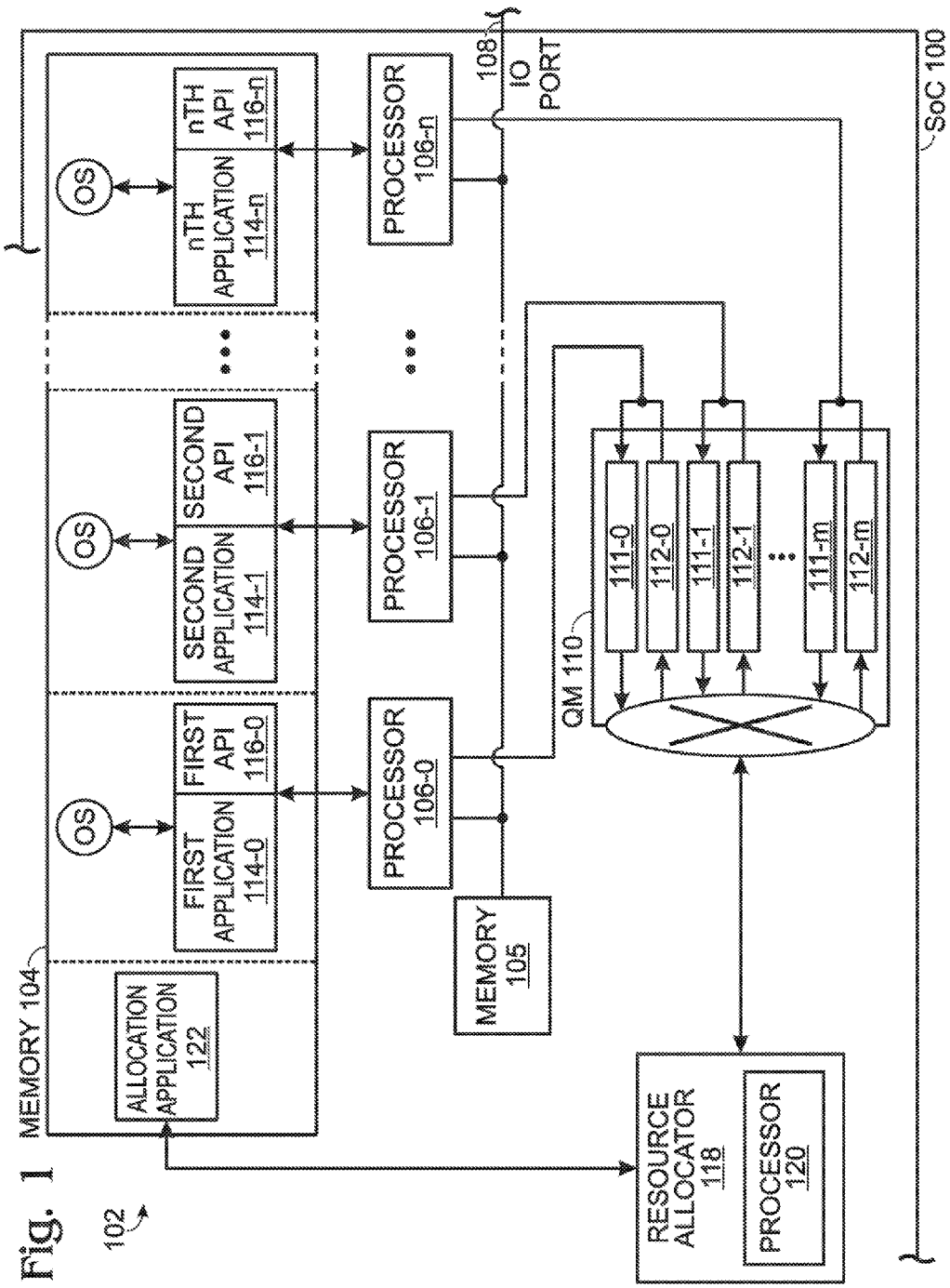
FIG. 1 is a schematic block diagram of a system-on-chip (SoC) with a hardware-based system for allocating shared resources.

FIG. 1 is a schematic block diagram of a system-on-chip (SoC) 100 with a hardware-based system for allocating shared resources. The system 102 comprises a memory 104 and a first plurality of processors 106. Processors 106-0 through 106-$n$ are shown, where n is an integer variable not limited to any particular value. The system 102 also includes at least one shared resource. The shared resource can be either a memory or an input/output (IO) port, or both. For simplicity a single shared memory 105 is shown. If memory 105 is a shared resource, it may be shared by all the processors 106. However, it should be understood that the system may be comprised of a plurality of shared memories (not shown). It should also be understood that a shared memory need not be shared by every processor in the system. In one aspect of the system, memories 104 and 105 are the same memory, which is shared by the first plurality of processors. Likewise, for simplicity a single IO port 108 is shown. If IO port 108 is a shared resource, it may be shared by all the processors 106. However, it should be understood that the system may be comprised of a plurality of IO ports (not shown). It should also be understood that a shared IO port need not be shared by every processor in the system.

The system 102 includes a queue manager (QM) 110 with a first plurality of input first-in first-out memories (FIFOs) 111 and a first plurality of output FIFOs 112. Shown are input FIFOs 111-0 through 111-m and output FIFO 112-0 through 112m, where m is an integer variable not limited to any particular value. The QM 110 dequeues requests from input FIFOs 111 and enqueues replies into output FIFOs 112. That is, the QM 110 determines the order in which the FIFOs are loaded with replies and unloaded with requests. In one simple aspect, the QM is a hardware logic state machine device that uses a round robin method of loading and unloading FIFOs. Alternatively, some FIFOs (i.e. some processors) may be given priority over other FIFOs. A variety of allocation schemes are known in the art that can be implemented in hardware. Hardware-based FIFO allocation decisions are a de facto form of resource allocation, assuming that shared resource grants are made on a first-come first-serve basis. Hardware-based resource allocation is both simple and fast.

A first application 114-0, enabled as a sequence of software instructions stored in the memory 104 and executed by a first processor 106-0, writes a first request to access the shared resource. A first application programming interface (API) 116-0, enabled as a sequence of software instructions stored in the memory 104 and executed by a first processor 106-0, loads the first request at a write pointer of a first input FIFO 111-0 associated with the first processor. That is, the requests is loaded into the first input FIFO tail. A resource allocator 118 reads the first request from a read pointer of the first input FIFO 111-0. That is, the request is read from the first input FIFO head. The resource allocator 118 generates a first reply responsive to the first request, and loads the first reply at a write pointer of a first output FIFO 112-0 associated with the first processor 106-0. Then, the first API 116-0 supplies the first reply, from a read pointer of the first output FIFO 112-0, to the first application 114-0, and the first application 114-0 performs a function in response to the first reply. For example, the first application 114-0 may access the shared resource if the first reply is a grant. Alternatively, if a grant is not received, the first application 114-0 may perform a task not involving the shared resource, or the first application may wait until access is permitted.

The first application 114-0 may write a request such as a go/no-go (yes or no) request for resource access or a scheduled time request for resource access. Further the request may include a length of time request for resource access (how long the resource will be used by the first application) or a resource access availability estimate (when will the resource be available). The request for a first resource (e.g., a first IO port) may also include a request for access to a comparable resource (e.g., a second IO port), in the event that the first resource is not available. The request may also include combinations of the above-mentioned parameters.

The resource allocator 118 includes an allocation microprocessor 120, and an allocation application 122, enabled as a sequence of instructions stored in the memory 104 and executed by the allocation microprocessor 120, for tracking shared resource status and allocations. As noted above, in a simple aspect of the system 102, the QM hardware allocation scheme is the de facto means of allocating resources to requesting applications. However, the allocation application 122 may be designed to give resource access priority to some applications (or some processors), over other applications. Further, it should be understood that although the QM may be seen as the de {octo resource allocator, the allocation application 122 is required to track available resources, in-use resources, and scheduled resource use.

The resource allocator 118 may generate a reply such as a grant with an embedded lock ID, where the lock ID is required for resource access, or a grant with the embedded lock ID and scheduled use time. That is, the reply may be a grant for a certain time in the future. The reply may also be a grant with the embedded lock ID and a use time limit, a reply with a resource availability estimate, a grant to a compatible resource, a rejection, or combinations of the above-mentioned replies. A resource availability estimate may be an estimate of when the resource allocator will likely send a grant to a requesting application, or it may be prediction of when a grant will be made available upon a subsequent request. Note: this is not an exhaustive list of every type of possible reply.

In one aspect, a second application 114-1, enabled as a sequence of software instructions stored in memory 104 and executed by a second processor 106-1, writes a second request to access the shared resource. A second API 116-1, enabled as a sequence of software instructions stored in memory 104 and executed by the second processor 106-1, loads the second request at a write pointer of a second input FIFO 111-1, associated with the second processor.

The resource allocator 118 reads the second request from a read pointer of the second input FIFO 111-1, subsequent to reading the first request, generates the first reply granting the first application 114-0 access to the shared resource, and generates a second reply rejecting the second request, in response to granting the first request. The second reply is returned via the second output FIFO 112-1.

In another aspect, the first application 114-0 writes a third request terminating granted access to the shared resource, and the first API 116-0 loads the third request at the write pointer of the first input FIFO 111-0. The resource allocator 118 reads the third request from the read pointer of the first input FIFO 111-0 and sends a notice to the second application 114-1 that the shared resource is available. In one aspect, the notice that the shared resource is available also includes a grant to access the shared resource.

In another aspect not explicitly shown, multiple applications associated with the same processor can share a resource. Similar to the example described above, a set of input and output FIFOs is assigned to each application running in a single processor, and the resource allocator manages a resource shared between the applications.

Functional Description

Figure 2:
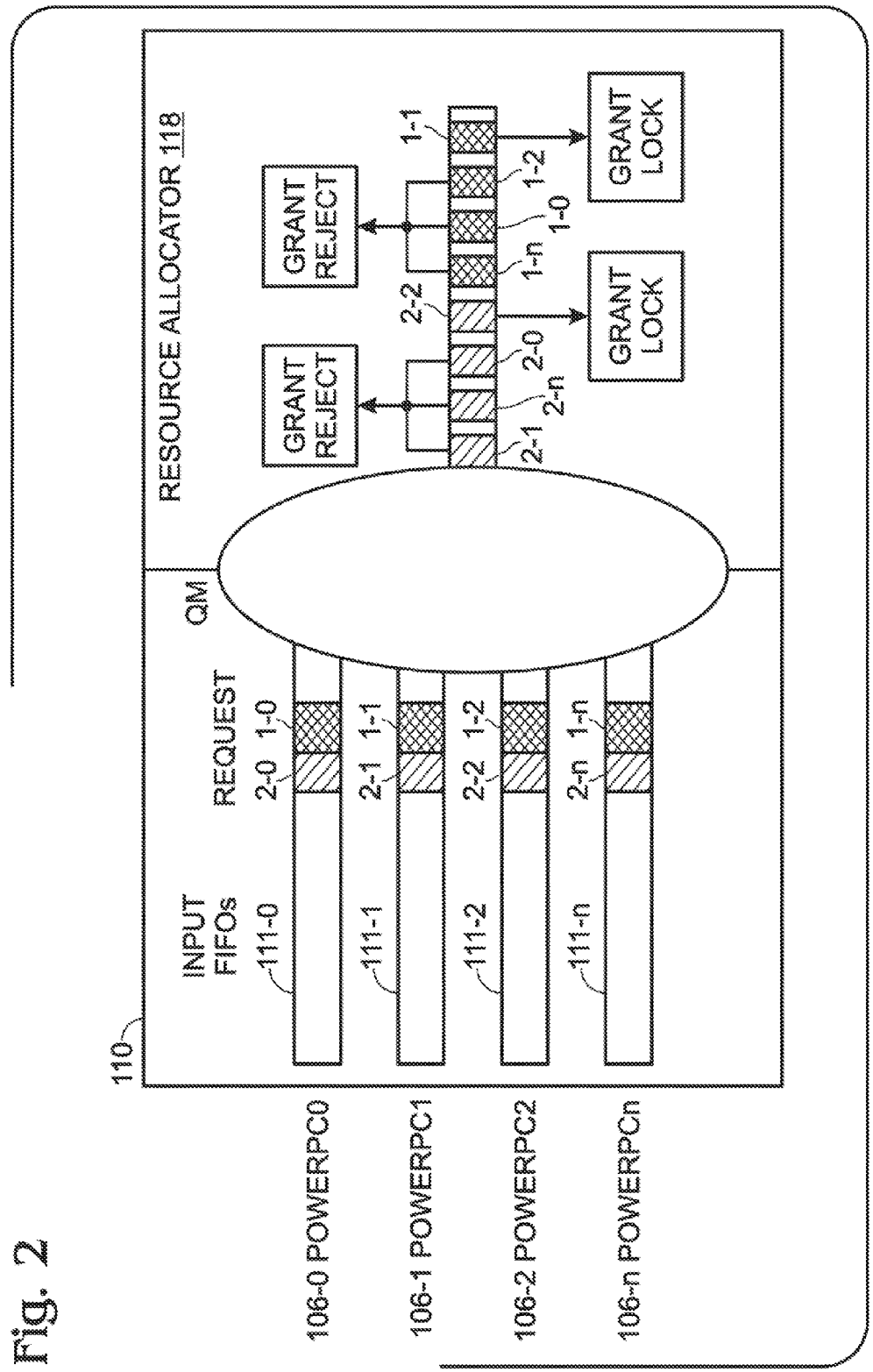
FIG. 2 is a schematic representation of a shared resource locking process.

FIG. 2 is a schematic representation of a shared resource locking process. The QM 110 received requests 1-1 and 1-2 simultaneously. Giving priority to the lowest numbered FIFO of the two FIFOs 111-1 and 111-2, request 1-1 is dequeued first and a grant is issued. Grants for requests 1-2, 1-0, and 1-n are denied. Requests 2-0, 2-1, 2-2, and 2-n are then enqueued simultaneously. Based upon a round robin allocation process, request 2-2 is dequeued first and a grant is issued. The other requests are initially denied, but then granted in round robin order if no other requests are subsequently received.

The system of FIGS. 1 and 2 makes it possible to protect and share the IO, and other shared resources in a system running multiple CPU cores, or multiple applications running on the same core. As shown, an SoC may be comprised of multiple CPU cores. Each core can have its own operating system and set of applications. It is desirable that each OS and the applications of each core have all the IO resources accessible and usable by them. This introduces a challenge of protecting and synchronizing the resources.

To enable such accessibility, a QM (queue manager) block is used. The QM is purely a hardware-based queue management and arbitration device—no software is involved in managing messages in the queue. All the allocation software 122 has to do is enqueue and dequeue messages from the queue based upon the hardware provided pointers. The low power small scale resource allocator microcontroller 120 is able to use the QM block 110 to enqueue/dequeue from the same queues as main CPUs. The number of messages residing in the queues is only limited by how much physical memory is available in system. That means that the number of locks can be defined in terms of thousands as opposed to the (at most) dozen locks enabled in a conventional system.

A software library in the allocation application 122 is used to acquire the lock, specify the timeout, and release the lock. The system is as simple as an application taking the lock from the resource allocator, using the resource, and releasing it. All an application needs to do is to call the API for all these operations. The application receives a reply, determines whether it received the lock or not, and if not, formulates a response. For example, the application can retry, or wait for the lock, or wait a period of time before retrying.

Figure 3:
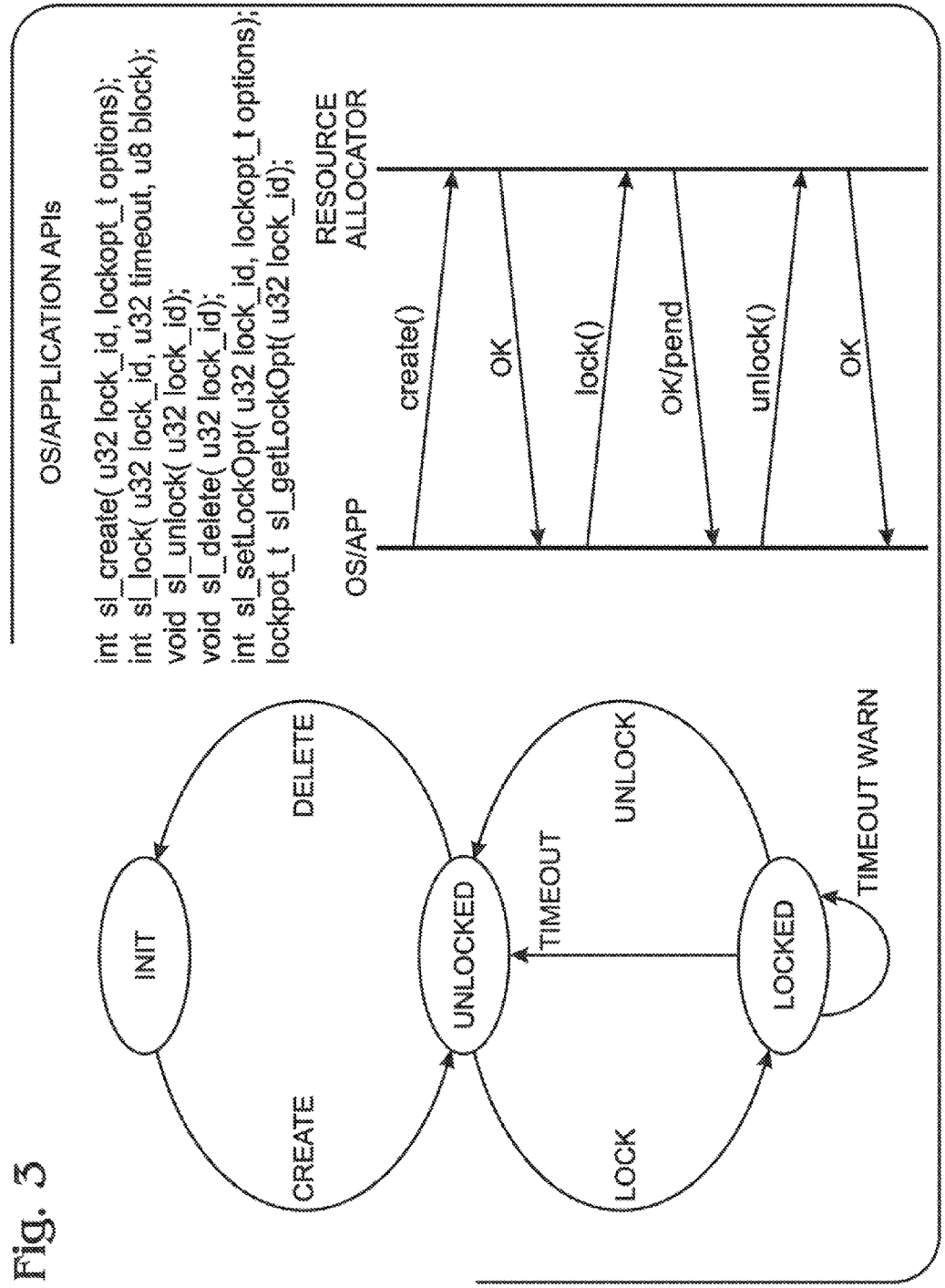
FIG. 3 is drawings of a resource allocation state machine.

FIG. 3 is drawings of a resource allocation state machine. The software APIs may be arranged as follows:
int sl_create(u32 lock_id, lockopt_t options);
int sl_lock(u32 lock_id, u32 timeout, u8 block);
void sl_unlock(u32 lock_id);
void sl_delete(u32 lock_id);
int sl_setLockOpt(u32 lock_id, lockopt_t options);
lockopt_t sl_getLockOpt(u32 lock_id).

As shown in the block diagram, the application calls the 'create' API to create a lock. The resource allocator creates the lock and provides the lock id to application. The resource allocator also stores state information regarding the lock, such as the lock is just created, the lock is not assigned, and it is available to requester at this point. Then, the application calls the 'lock' API, which asks the resource allocator to grant the lock for the given lock id. The resource allocator looks at the state of this lock id, and grants/denies the lock. When the application is done with the lock, it calls 'unlock' with given lock id. The resource allocator then frees up the lock and updates its state information. Then, the lock is granted to any requester that is waiting to get the same lock. If application is done using this lock completely, it can also delete this lock.

These APIs manage creating, removing, acquiring, and releasing locks, and provide some other options. The API ensures that the application is not locked up by specifying a timeout mechanism for waiting. That way, conventional deadlock problems can also be avoided. These APIs enqueue/dequeue messages to QM to acquire/release the locks. The APIs may use operating system independent code, easily usable by any application, and may be enabled using locking APIs, like the ones generally provided for semaphores.

In one aspect, as shown in FIG. 1, there are two queues given per processor. So, if there are four processors in the SoC, there are eight queues defined for locking purpose, one for each direction (i.e. CPU 106-0 to resource allocator 118 and resource allocator to CPU 106-0). Whenever an application running on a CPU needs to create a lock, it enqueues a request to its assigned queue, which is dequeued by the resource allocator. The resource allocator reads the message and determines what operation needs to be performed. If the resource allocator needs to create a lock, it will just create it and send the lock ID back to the application.

For example, if two separate applications, running on two different processors, need to share a PCIe device, they need a lock ID to use to acquire/release the lock. As they are running on two different processors, they are running completely in parallel and don't know if the other application is asking for the same lock. In the system of FIG. 1, it is possible to ask for the same lock for multiple different applications from multiple processors at the same exact time. This is possible using QM hardware. The applications can create a message, specifying the lock ID to be acquired. The messages can be enqueued in the assigned queues, at the same time. The QM hardware delivers the messages to resource allocator. As the resource allocator dequeues from different queues with the help of QM hardware, the requests are prioritized using a scheduling mechanism. In one aspect, the scheduling is round robin, but other scheduling algorithms like strict priority, weighted round robin. etc. can also be used.

The QM hardware takes care of all the arbitration between all the queues and provides only one message (at a time) from the selected queue to resource allocator. The resource allocator looks at the message and determines the requested operation. If the operation is 'acquire lock', then it will check whether the lock has already been provided to another application. If it is not provided, it will grant the lock acquire and send the grant message back to the application. Otherwise, it will send a negative acknowledgement (NAK) message to application. In some aspects, the NAK message may include other information such as an operation timeout value or that the lock ID is not found.

Then, the resource allocator dequeues the next request. If it is an acquire lock request for a different lock ID, and lock is available, a grant reply message is sent. If it is for the same lock, then a NAK message, with parameters, is sent.

FIG. 4 is a flowchart illustrating a hardware-based method for allocating shared resources in an SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 400.

Step 402 provides an SoC with a first plurality of processors, at least one shared resource, a queue manager (QM) with a first plurality of input FIFOs and a first plurality of output FIFOs, and a resource allocator enabled as a sequence of software instructions stored in memory and executed by an allocation processor. As noted above, IO ports and memories are examples of shared resources. In Step 404 a first application, enabled as a sequence of software instructions stored in memory and executed by a first processor, writes a first request to access the shared resource. In Step 406 a first API, enabled as a sequence of software instructions stored in memory and executed by a first processor, loads the first request at a write pointer of a first input FIFO associated with the first processor. In Step 408 the resource allocator reads the first request from a read pointer of the first input FIFO. In Step 410 the resource allocator generates a first reply, responsive to the first request, and in Step 412 loads the first reply at a write pointer of a first output FIFO associated with the first processor. In one aspect, the resource allocator reading requests in Step 408 and loading replies in Step 412 includes the QM dequeuing requests from input FIFOs and enqueuing replies into output FIFOs. In Step 414 the first API supplies the first reply, from a read pointer of the first output FIFO, to the first application. In Step 416 the first application performs a function in response to the first reply.

In one aspect, generating the first reply in Step 410 includes the resource allocator generating a reply such as a grant with an embedded lock ID, where the load ID is required for resource access, a grant with the embedded lock ID and scheduled use time, a grant with the embedded lock ID and a use time limit, a grant with the embedded lock ID to a compatible resource, a reply with a resource availability estimate, a rejection, or combinations of the above-mentioned replies.

In another aspect, writing the first request in Step 404 includes writing a request such as a go/no-go request for resource access, a scheduled time request for resource access, a length of time request for resource access, a resource access availability estimate, and a request for access to a comparable resource, or combinations of the above-mentioned replies.

In one aspect, in Step 405 a second application, enabled as a sequence of software instructions stored in memory and executed by a second processor, writes a second request to access the shared resource. In Step 407 a second API, enabled as a sequence of software instructions executed by a second processor, loads the second request at a write pointer of a second input FIFO, associated with the second processor. Then, Step 408 includes the resource allocator reading the second request from a read pointer of the second input FIFO, subsequent to reading the first request. Generating the first reply in Step 410 includes the resource allocator generating the first reply, granting the first application access to the shared resource, and generating a second reply rejecting the second request, in response to granting the first request.

In another aspect, in Step 418 the first application writes a third request terminating granted access to the shared resource. In Step 420 the first API loads the third request at the write pointer of the first input FIFO. In Step 422 the resource allocator reads the third request from the read pointer of the first input FIFO, and in Step 424 the resource allocator sends a notice to the second application that the shared resource is available. For example, the notice may include a grant to access the shared resource.

A system and method have been provided for sharing resources in an SoC. Examples of particular message structures, processors, and hardware units have been presented to illustrate the invention. However, the invention is not limited to merely these examples. Other variations and embodiments of the invention will occur to those skilled in the art.

We claim:

1. A method for queuing a request by a processor to access a shared resource, comprising:
   receiving the request to access the shared resource, from a processor of a plurality of processors executing an application;
   determining a queue order for a reply to the request based at least in part on the processor issuing the request and on a resource access priority level of the application executed by the processor;
   generating the reply to the request comprising a grant to the shared resource with an embedded lock ID, wherein the embedded lock ID enables access to the shared resource for a predetermined length of time;
   queuing the reply based on the queue order in an input of a first-in-first-out memory, wherein the input of the first in first out memory queues a set of replies corresponding to requests from the plurality of processors;
   transmitting the reply to the processor;
   receiving a second request to access the shared resource, from a second processor of the plurality of processors executing a second application;
   denying access to the shared resource to the second processor requesting the shared resource in response to the predetermined length of time not having elapsed; and
   generating a second reply to the second request that indicates that access was rejected and wherein the second reply also indicates an estimated time of availability for the shared resource.

2. The method of claim 1, wherein the reply comprises a grant with the embedded lock ID to a resource similar to the shared resource, a grant with the embedded lock ID and a use time limit, a reply with a resource availability estimate, a rejection, or combinations of the above-mentioned reply.

3. The method of claim 2, further comprising: queuing the reply in a plurality of output first in first out memories, wherein each of the plurality of output first in first out memories queue replies for designated processors.

4. The method of claim 1 wherein receiving the request further comprises receiving a request comprising a go/no-go request for resource access, a scheduled time request for resource access, a length of time request for resource access, a resource access availability estimate, and a request for access to a resource similar to the shared resource, or combinations of the above-mentioned reply.

5. The method of claim 1 further comprising: receiving a notification that the processor granted access to the shared resource has terminated the access to the shared resource; and sending a notice to the second processor associated with the second request in a set of queued requests that the shared resource is available.

6. The method of claim 5 wherein sending the notice to the second processor associated with the second request comprises granting access to the shared resource.

7. The method of claim 1, further comprising granting access to a plurality of shared resources.

8. The method of claim 1, further comprising cycling allocation of access to the shared resource to the plurality of processors based on a predefined pattern.

9. The method of claim 1 further comprising cycling allocation of access to the shared resource based on an order in which the request was received.

10. A system that queues a reply to a request by a processor to access a shared resource, comprising:
    a queue manager comprising an input of a first-in-first-out memory and an output of a first-in-first-out memory, wherein the queue manager is configured for receiving the request to access the shared resource, wherein the request is issued by a processor of a plurality of processors executing an application;
    a resource allocator configured for granting access to the shared resource to a processor based on a queue order and is further configured for generating the reply to the request comprising a grant to the shared resource with an embedded lock ID, wherein the embedded lock ID enables access to the shared resource for a predetermined length of time;
    the queue manager is also configured for queuing a reply to the request based on the queue order, wherein the queue order is determined based at least in part on the processor associated with the request and on a resource access priority level of the applications executed by the processor;
    the queue manager is further configured for receiving a second request to access the shared resource, from a second processor of the plurality of processors executing a second application and the resource allocator is configured for denying the access to the shared resource to the second processor in response to the predetermined length of time not having elapsed; and
    wherein the resource allocator is further configured for generating a second reply to the second request that indicates that access was rejected and wherein the second reply also indicates an estimated time of availability for the shared resource.

11. The system of claim 10 wherein the shared resource is selected from a group consisting of a memory and an input/out (IO) port.

12. The system of claim 10 wherein the resource allocator further comprises: an allocation microprocessor; and, an allocation application, executed by the allocation microprocessor, that is configured for tracking shared resource status and allocations.

13. The system of claim 10 wherein the reply generated by the resource allocator comprises a grant with the embedded lock ID and a use time limit a grant with the embedded lock ID to a resource similar to the shared resource, a reply with a resource availability estimate, a rejection, or combinations of the above mentioned reply.

14. The system of claim 10 wherein a set of requests are dequeued in a set of input first in first out memories and the replies are queued in a set of output first-in-first-out memories.

15. The system of claim 10 wherein the request comprises at least one request comprising a go/no-go request for resource access, a scheduled time request for resource access, a length of time request for resource access, a resource access availability estimate, and a request for access to a resource similar to the shared resource, or combinations of the above-mentioned requests.

16. The system of claim 10 wherein in response to receiving a notification that the processor granted access to the shared resource has terminated the access to the shared resource, the resource allocator is further configured for sending a notice to the second processor associated with a second request in a set of queued requests that the shared resource is available.

17. The system of claim 16 wherein the resource allocator is configured for sending the notification with a grant to access the shared resource.

18. The system of claim 10, wherein the resource allocator is configured for cycling allocation of access to the shared resource based on an order in which the request was received.

19. The system of claim 10, wherein the first in first out memory of the set of input and output first in first out memories are associated with designated processors.

20. A non-transitory computer-readable storage device comprising computer-executable instructions that, in response to execution, cause a system including a processor to perform operations, comprising:
  receiving a request to access a shared resource, wherein the request is issued by a processor of a plurality of processors executing an application;
  determining a queue order for a reply to the request based at least in part on the processor and on a resource access priority level of the application executed by the processor;
  generating the reply to the request comprising a grant to the shared resource with an embedded lock ID, wherein the embedded lock ID enables access to the shared resource for a predetermined length of time;
  queuing the reply request in an input first-in-first-out memory based on the queue order, wherein the input first-in-first-out memory queues replies to a plurality of designated processors;
  transmitting the reply to the processor;
  receiving a second request to access the shared resource, from a second processor of the plurality of processors executing a second application;
  denying access to the shared resource to the second processor requesting the shared resource in response to the predetermined length of time not having elapsed; and
  generating a second reply to the second request that indicates that access was rejected and wherein the second reply also indicates an estimated time of availability for the shared resource.

\* \* \* \* \*